(12) United States Patent
Williamson

(10) Patent No.: US 9,179,666 B1
(45) Date of Patent: Nov. 10, 2015

(54) PORTABLE TREESTAND BLIND

(71) Applicant: Kenneth Dwayne Williamson, Millington, TN (US)

(72) Inventor: Kenneth Dwayne Williamson, Millington, TN (US)

(*) Notice: Subject to any disclaimer, the term of this patent is extended or adjusted under 35 U.S.C. 154(b) by 0 days.

(21) Appl. No.: 13/844,809

(22) Filed: Mar. 16, 2013

(51) Int. Cl.
*A01M 31/02* (2006.01)
*E04H 15/04* (2006.01)
*E04H 15/00* (2006.01)

(52) U.S. Cl.
CPC ........... *A01M 31/025* (2013.01); *E04H 15/001* (2013.01); *E04H 15/04* (2013.01)

(58) Field of Classification Search
CPC ..... E04H 15/04; E04H 15/001; A01M 31/025
USPC .................................................. 135/90, 901
See application file for complete search history.

(56) References Cited

U.S. PATENT DOCUMENTS

| | | | | |
|---|---|---|---|---|
| 3,116,808 | A * | 1/1964 | Riley | 182/129 |
| 3,394,720 | A * | 7/1968 | Moss | 135/125 |
| 5,613,512 | A * | 3/1997 | Bean | 135/90 |
| 6,244,286 | B1 * | 6/2001 | Russo | 135/128 |
| 6,431,192 | B2 | 8/2002 | O'Hare | |
| 7,137,399 | B1 | 11/2006 | Ransom et al. | |
| 7,182,091 | B2 * | 2/2007 | Maddox | 135/90 |
| 7,735,503 | B2 | 6/2010 | Jenkinson | |
| 7,958,968 | B1 | 6/2011 | Stabler | |
| 7,997,291 | B2 * | 8/2011 | Gressette et al. | 135/96 |
| 8,991,411 | B1 * | 3/2015 | Neuman | 135/96 |
| 2002/0078988 | A1 | 6/2002 | Valpredo | |
| 2006/0249640 | A1 | 11/2006 | Hanson | |

OTHER PUBLICATIONS

Ol' Man Treestands, Multi-Vision Climbing Stand Series (2010), Ol' Man Treestands, Tallahassee, Florida, USA (internet web page printout from "olmanoutdoors.com/stands/climbers/Multivision").
Ol' Man Treestands, The Ol' Man Treestands Multi-Vision Series Instruction Manual (May 2009), 14 pages, Ol' Man Treestands, Tallahassee, Florida, USA.
B'N'M Pole Company, Model BW3 Black Widow Telescoping Pole (at least as early as Oct. 2011), 1 page, B'N'M Pole Company, West Point, Mississippi, USA (internet web page printout from "bnmpoles.com/p-119-black-widow.aspx").

* cited by examiner

*Primary Examiner* — David R Dunn
*Assistant Examiner* — Danielle Jackson
(74) *Attorney, Agent, or Firm* — Walker, McKenzie & Walker, P.C.

(57) ABSTRACT

A treestand blind for use with a treestand adjacent a tree. The treestand includes a frame and a platform at a lower portion thereof. The blind includes first and second telescoping poles, each having lower and upper ends, each pole having an upper and lower portion, each of the poles having a tether attached proximate the upper end. The tether is attached around the tree with the poles being bowed both forwardly and laterally under tension. The blind also includes a pole mount attached to a front edge of the platform and has left and right receptacles respectively receiving the lower ends of the poles, with the poles each being forwardly angled at a first obtuse angle and laterally outwardly splayed at a second obtuse angle. A cover is wrapped about the poles and the frame, providing a covered space thereinside. The cover has zippered flaps that open.

4 Claims, 6 Drawing Sheets

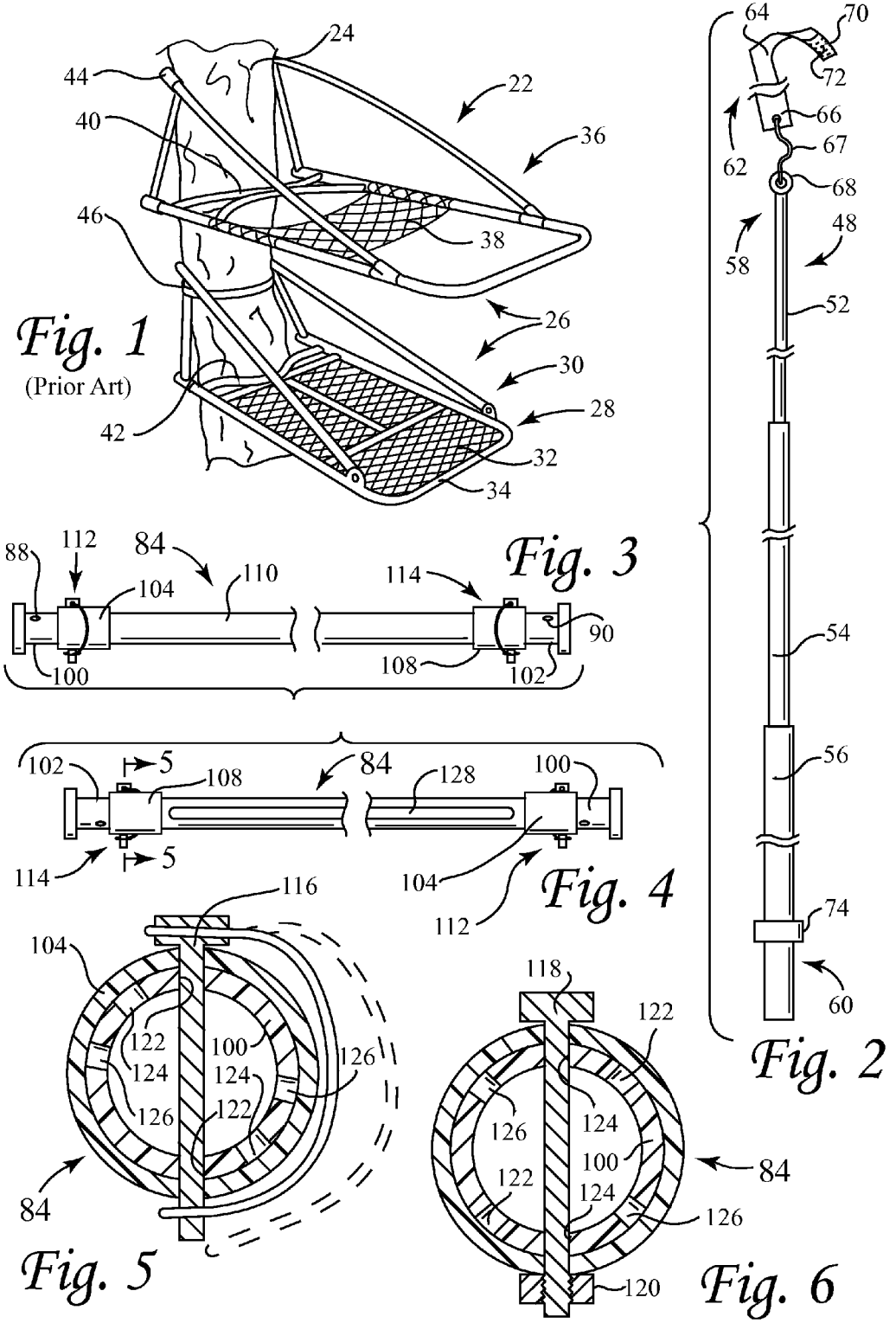

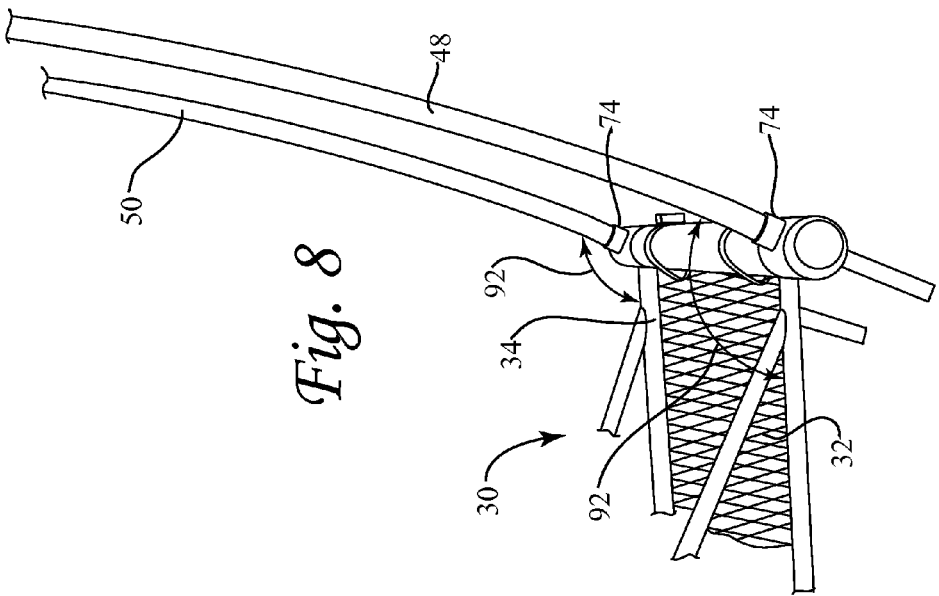
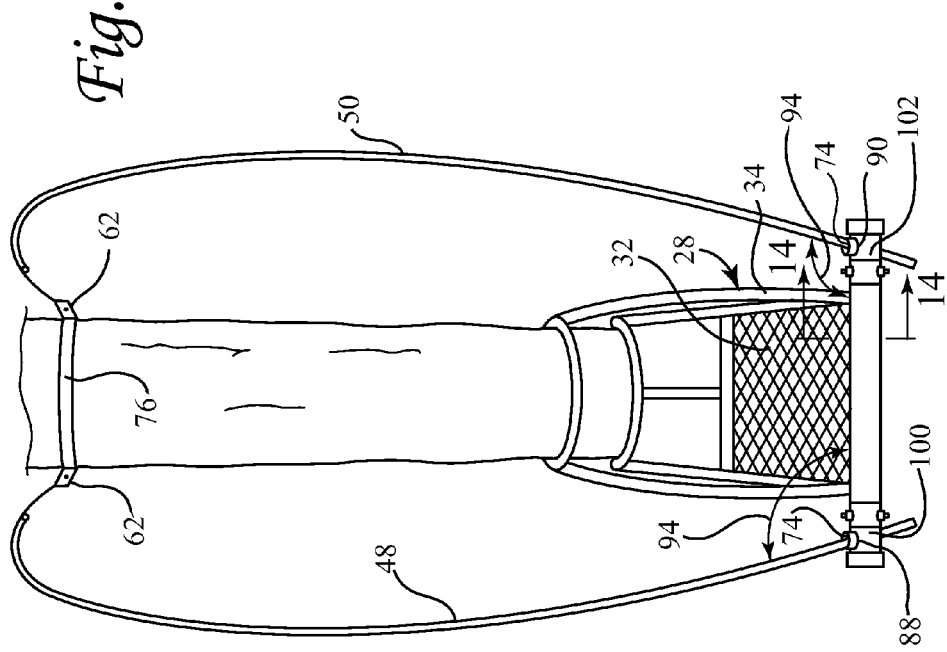

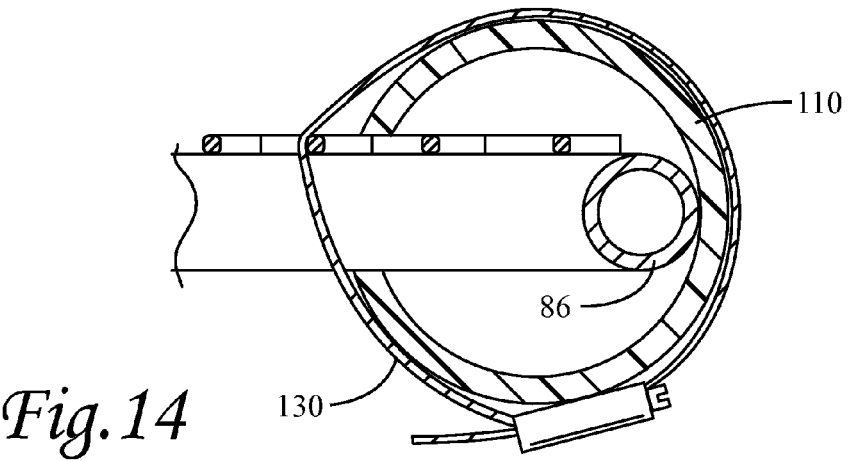
Fig. 14
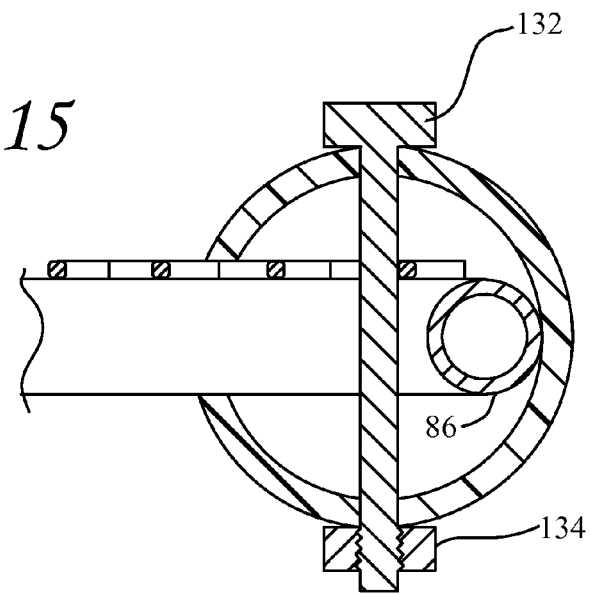
Fig. 15
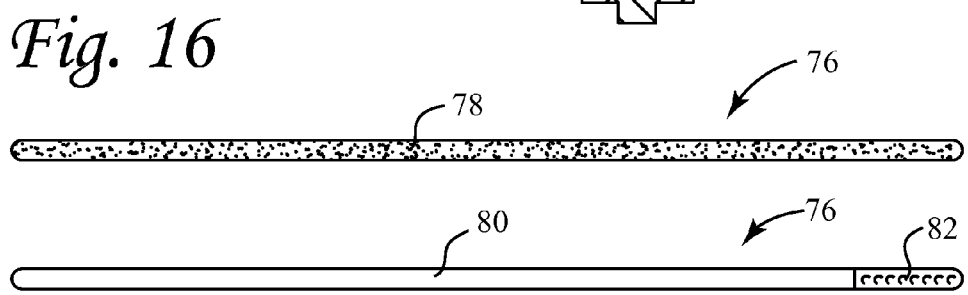
Fig. 16
Fig. 17

PORTABLE TREESTAND BLIND

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to blinds and stands used by outdoor hunters and nature watchers, and in particular, to blinds for treestands used by hunters and nature watchers.

2. Information Disclosure Statement

When hunters hunt outdoors and when nature watchers observe wildlife and birds in the wild, so-called "treestands" are often used that provide a seat and/or standing platform for the hunter or nature watcher above the ground. Such treestands are typically secured to a tree and have a raised platform that is supported above the ground. Such a treestand raises the hunter or nature watcher so as to provide increased visibility, and also to keep the hunter or nature watcher off of wet ground. Well known such treestands are the Multi-Vision Climbing Stand Series treestands manufactured and sold by OL' MAN Treestands, 311 East Jennings St., Tallahassee, Fla. 32301. There are problems with the use of such exposed stands, namely, that they expose the hunter or nature watcher to the elements, such as wind, rain, and colder temperatures. This can detract from the outdoors experience and limit the time that the hunter or nature watcher can stay outdoors. Additionally, when a hunter or nature watcher is exposed, wildlife are deterred from approaching because they can easily see, smell, and hear the individual.

It is therefore desirable to have a blind for use with treestands by hunters or nature watchers. It is further desirable that such a blind be lightweight and portable, provide shelter for the hunter or nature watcher from the elements, hide the hunter or nature watcher from wildlife, and be easy to set up by a single person. It is further desirable to provide a portable blind that can be adapted for use with a variety of portable climbing deer stands, stationary ladder stands, and tree stands.

A preliminary patentability search produced the following patents and patent application publications, some of which may be relevant to the present invention: O'Hare, U.S. Pat. No. 6,431,192 (issued Aug. 13, 2002); Ransom et al., U.S. Pat. No. 7,137,399 (issued Nov. 21, 2006); Jenkinson, U.S. Pat. No. 7,735,503 (issued Jun. 15, 2010); Stabler, U.S. Pat. No. 7,958,968 (issued Jun. 14, 2011); Valpredo, U.S. Patent Application Publication 2002/0078988A1 (published Jun. 27, 2002); and Hanson, U.S. Patent Application Publication 2006/0249640A1 (published Nov. 9, 2006).

Additionally, OL' MAN Outdoors, Multi-Vision Climbing Stand Series, (internet web page advertisement 2010), and The OL' MAN Treestands Multi-Vision Series Instruction Manual (May 2009), both published by OL' Man Treestands, 311 East Jennings St., Tallahassee, Fla. 32301, describe a treestand suitable for use with the present invention.

None of these references, either singly or in combination, discloses or suggests the present invention.

BRIEF SUMMARY OF THE INVENTION

The present invention is a portable treestand blind for use in combination with a treestand to protect a hunter or nature watcher from the elements and to conceal the hunter or nature watcher from wildlife. The treestand includes a frame and a platform at a lower portion thereof. The blind includes first and second telescoping poles, each having lower and upper ends, each pole having an upper and lower portion, each of the poles having a tether attached proximate the upper end. The tether is attached around the tree with the poles being bowed both forwardly and laterally under tension. The blind also includes a pole mount attached to a front edge of the platform and the pole mount has left and right receptacles respectively receiving the lower ends of the poles, with the poles each being forwardly angled at a first obtuse angle and laterally outwardly splayed at a second obtuse angle. A cover is wrapped about the poles and the frame, providing a covered space thereinside. The cover has zippered flaps that open.

It is an object of the present invention to be lightweight and portable, provide shelter for the hunter or nature watcher from the elements, hide the hunter or nature watcher from wildlife, and be easy to set up by a single person. It is a further object of the present invention to provide a portable blind that can be adapted for use with a variety of portable climbing deer stands, stationary ladder stands, and tree stands.

BRIEF DESCRIPTION OF THE SEVERAL VIEWS OF THE DRAWING

FIG. 1 is a perspective view of a prior art tree stand mounted to a tree.

FIG. 2 is a side view of a telescoping pole of the present invention, showing a tether attached to the upper end.

FIG. 3 is a front view of the pole mount of the present invention.

FIG. 4 is a rear view of the pole mount of the present invention shown removed from the platform.

FIG. 5 is a transverse sectional view of the pole mount of the present invention, taken substantially along the line 5-5 shown in FIG. 4, showing a first embodiment of a rotation anchor pin, with the mount sleeve shown in a first position.

FIG. 6 is a transverse sectional view of the pole mount of the present invention, similar to FIG. 5 but showing a second embodiment of a rotation anchor pin, with the mount sleeve shown in a second position, rotated from the first position shown in FIG. 5.

FIG. 7 is a front view of the lower portion of the treestand with the pole mount attached and the poles installed, showing the bowing of the poles and the angles thereof, with the upper portion of the treestand removed for clarity.

FIG. 8 is a partial side view of the lower portion of the treestand with the pole mount attached and the poles installed, showing the bowing of the poles and the angles thereof, with the upper portion of the treestand removed for clarity.

FIG. 14 is a transverse sectional view of the pole mount of the present invention taken substantially along the line 14-14 shown in FIG. 7, showing a first embodiment of attachment of the pole mount to the platform.

FIG. 15 is a transverse sectional view of the pole mount of the present invention, similar to FIG. 14 but showing a second embodiment of attachment of the pole mount to the platform.

FIG. 16 is a plan view of one side of the tree-encircling belt.

FIG. 17 is a plan view of the other side of the tree-encircling belt.

DETAILED DESCRIPTION OF THE INVENTION

Figure 9:
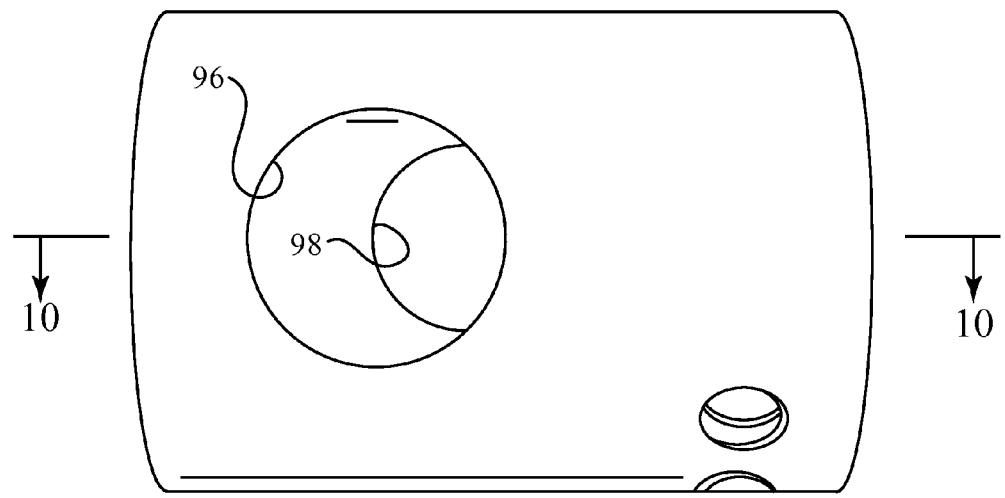
FIG. 9 is a view of the rotation sleeve of the pole mount, showing the position of the various holes.
Figure 10:
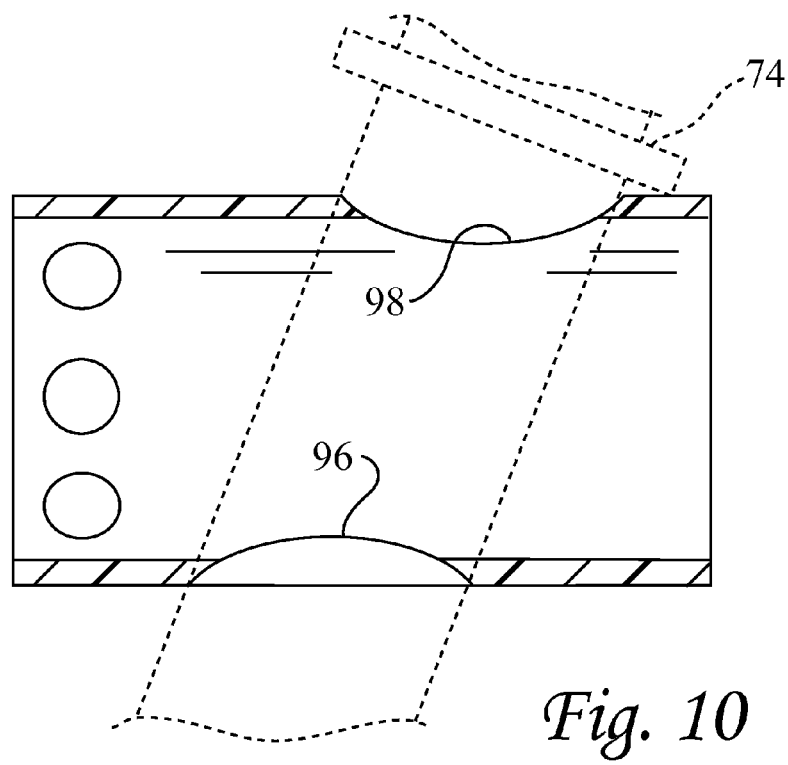
FIG. 10 sectional view of the rotation sleeve of the pole mount, taken along the diameter line 10-10 shown in FIG. 9.
Figure 12:
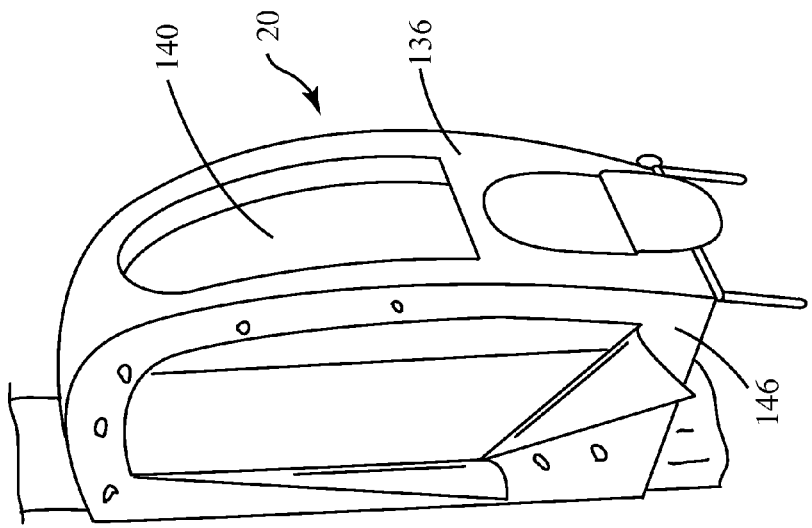
FIG. 12 is a perspective view of the blind with the cover installed, similar to FIG. 11 but with the flaps shown opened.
Figure 11:
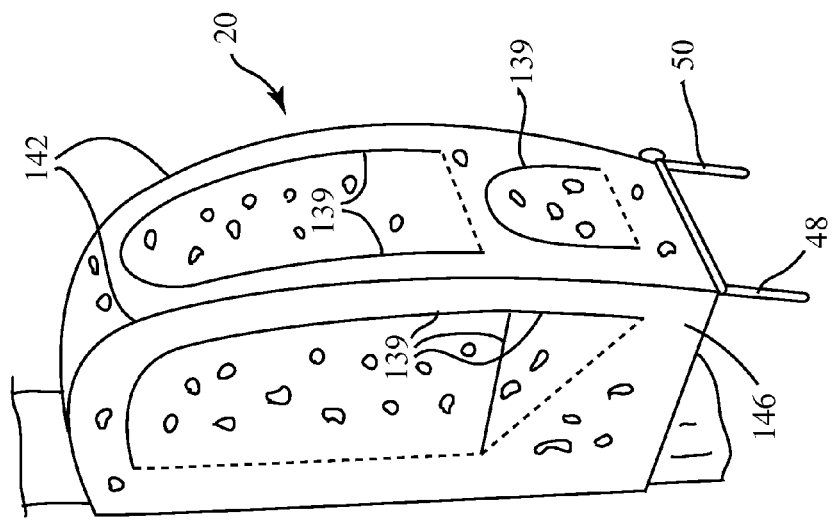
FIG. 11 is a perspective view of the blind with the cover installed.
Figure 13:
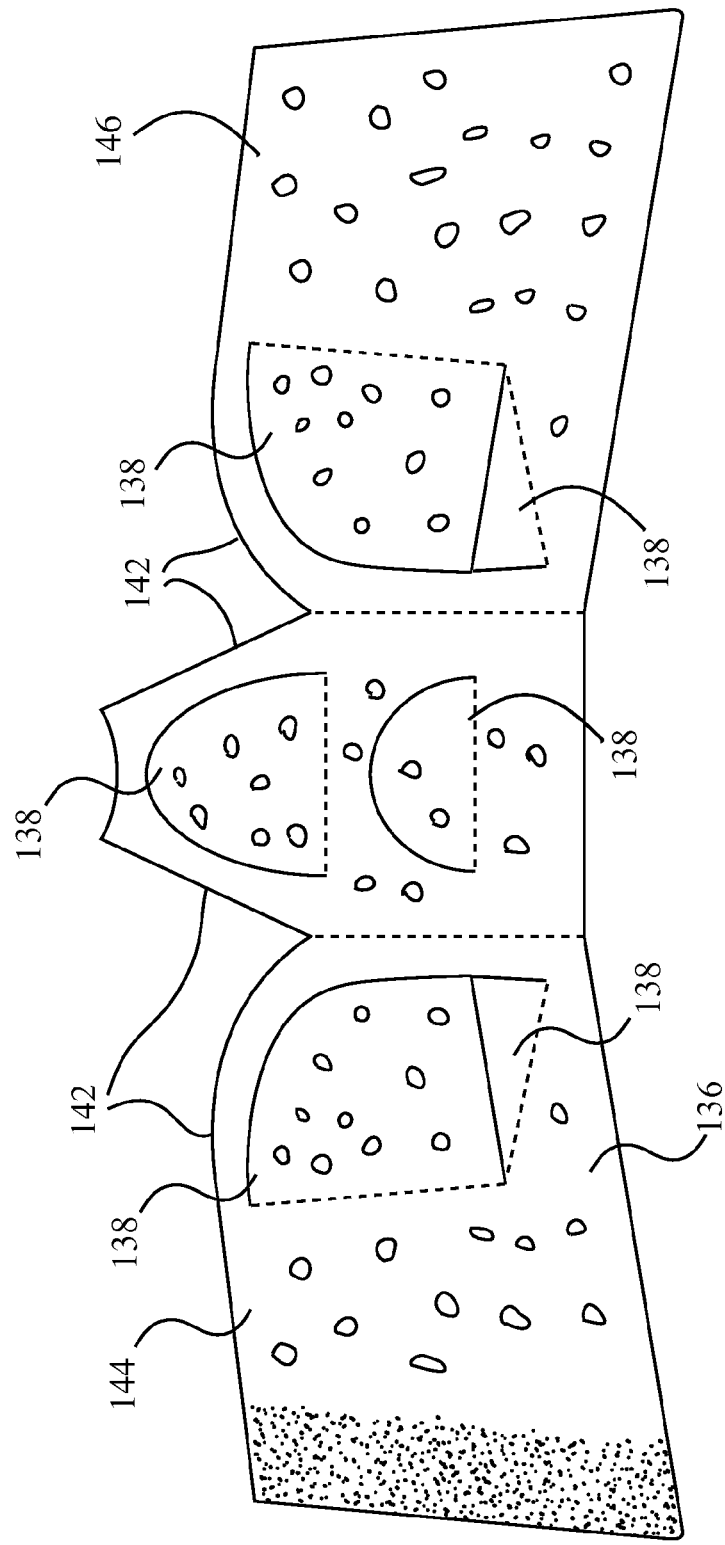
FIG. 13 is a plan view of the cover before installation over the poles.

Referring to FIGS. 1-15, the present invention is a tree-stand blind 20 is seen to be for use in combination with a treestand 22 adjacent a tree 24. Treestand 22 is well-known and typically comprises a treestand frame 26 having a platform 28 at a lower frame portion 30 thereof and extending forwardly from the frame. Platform 28 is typically formed of spread metal grating 32 welded to an encircling platform tube 34. Treestand 22 may optionally and preferably include a seating frame 36 having a hammock seat 38 spanning seating frame 36. Seating frame 36 and lower frame portion 30 typically have curved rear bars 40, 42 that rest against the tree, and the seating frame 36 and lower frame portion 30 typically are attached to the tree 24 by encircling cables 44, 46. While seating frame 36 is preferably and typically provided, a stool or upturned bucket (not shown) may be set upon grating 32 as a seat.

A suitable preferred treestand for use with the blind of the present invention is the Multi-Vision Climbing Stand Series treestand manufactured and sold by OL' MAN Treestands, 311 East Jennings St., Tallahassee, Fla. 32301. It shall be understood that the blind of the present invention may easily be adapted for use with other treestands by modification of the pole mount, hereinafter described, so as to provide appropriate left and right pole receptacles proximate the front edge of the platform of such a different treestand.

Blind 20 includes first and second telescoping poles 48, 50. Because poles 48 and 50 are substantially identical, a description of one, such as pole 48 shown in FIG. 2, suffices for both.

Pole 48 has a plurality of telescoping sections 52, 54, 56, with the stiffness of the upper portion 52 being less than the stiffness of the middle portion 54, whose stiffness, in turn, is less than the flexibility of the lower portion 56. This decreasing stiffness (i.e., increasing flexibility) of the pole 48 from lower portion 56 to upper portion 52 permits the poles, when angled within the left and right pole receptacles in a manner hereinafter described, causes the poles to bow in the distinctive shape shown in the drawings, so as to provide greater room within the covered space inside the cover than believed heretofore possible in the prior art.

Each pole has an upper end 58 and a lower end 60 and a tether 62 attached proximate upper end 58. Tether 62 preferably includes a 14.75 inch (37.5 cm.) flexible strap 64 of leather attached at a proximate end 66 by a 1.5 inch (3.8 cm.) heavy-duty nylon string 67 to eyelet 68 at the upper end 58 of the pole, and having, at its distal end 70, a 6.75 inch (17.1 cm.) section 72 of a "hook" portion of a coacting fastener such as that sold under the trademark VELCRO®. A collar 74 is provided on each pole spaced a distance from the lower end 60 of the pole acting as a stop to limit the insertion distance of the lower end 60 of the pole into the receptacle of the pole mount, as hereinafter described.

As seen in FIGS. 16 and 17, a tree-encircling belt 76, is provided having on its entire length of a first side 78 the "loop" portion of a coacting fastener such as that sold under the trademark VELCRO®. On the second side 80 of belt 76, a 7 inch (17.8 cm.) length 82 of the "hook" portion of a coacting fastener such as that sold under the trademark VELCRO® is provided at one end. Belt 76 is preferably 66 inches (168 cm.) long so as to encircle a tree up to 18 inches (46 cm.) in diameter. When the blind is assembled, belt 76 is wrapped around an upper portion of the tree 24 (as best seen in FIG. 7), with length 82 of the "hook" portion being engaged with the loop portion on first side 78 so as to bind belt 76 around the tree 24. Then, with the lower ends of each pole being inserted into the pole mount, section 72 of the "hook" portion of the tether 62 is attached to the "loop" portion on the first side 78 of belt 76, thereby attaching each tether 62 to tree 24.

For flexibility, each of the telescoping poles of the present invention are preferably made of fiberglass or a fiberglass graphite composite material. A suitable telescoping pole for use with the present invention is the Model BW3 Black Widow three-section telescoping pole (ten foot length) having a metal "eye" upper tip for attaching the pole tip retainer, manufactured and sold by the B'N'M Pole Company, Old Aberdeen Rd, West Point, Miss. 39773. This pole is modified by having the sections cut to the lengths 33 inches (83.8 cm.) for the top section, 36 inches (91 cm.) for the middle section, and 43 inches (109 cm.) for the bottom section, with the enlarged bottom end of the bottom section being removed to permit insertion into the pole mount.

Blind 20 further includes a pole mount 84 attached to the platform 28 proximate a front edge 86 thereof. Mount 84 has a left and a right receptacle 88, 90 respectively receiving the lower end 60 of the first and second poles 48, 50 with first and second poles each being forwardly angled a first obtuse angle 92 (preferably about 110 degrees) with respect to the horizontal, and with said first and second poles each also being laterally outwardly splayed a second obtuse angle 94 (preferably about 105 degrees) with respect to the horizontal. Receptacles 88, 90 are preferably a pair of longitudinally offset holes 96, 98 respectively forming angled bores in left and right mount sleeves 100, 102 mounted upon pole mount 84 for selective rotation with respect thereto. Tubes 104, 108 are gluingly received onto the left and right ends of the mount midsection 110, and mount sleeves 100, 102 are received into the tubes 104, 108. Left and right rotation anchors 112, 114, either a clevis pin 116 as seen in FIG. 5 or a well-known bolt 118 and nut 120 as shown in FIG. 6, are selectively received through one of a plurality of transverse bores 122, 124, 126 through the mount sleeve, it being understood that the left and right mount sleeves are mirror images of each other. By comparison of the rotated sleeves shown in FIGS. 5 and 6, it can be seen that the mount sleeve can be placed in a plurality of selective fixed positions with respect to the pole mount midsection, thereby adjusting the first obtuse angle 92.

Pole mount midsection 110 is seen to have a longitudinal slot 128 receiving the front edge 86 of the platform, with the platform being secured to the pole mount midsection either by a well-known hose clamp 130 or a bolt 132 and nut 134.

A cover 136 is provided having a plurality of zippered flaps 138 having zippers 139. When cover 136 is wrapped about the poles and the frame, a covered space 140 is provided thereinside. Zippers 142 are also provided along the edges of cover 136 so as to join the edges of the cover over the poles. When the cover is placed upon the poles, the left and right walls 144, 146 are spaced substantially further apart with respect to each other at the front of the blind than at the rear of the blind.

INDUSTRIAL APPLICABILITY

The present invention is a portable treestand blind for use with a treestand to protect a hunter or nature watcher from the elements and to conceal the hunter or nature watcher from wildlife. The blind is lightweight, portable, and is easily set up by a single person.

Although the present invention has been described and illustrated with respect to a preferred embodiment and a preferred use therefor, it is not to be so limited since modifications and changes can be made therein which are within the full intended scope of the invention.

I claim:

1. A blind for use in combination with a treestand adjacent a tree, said treestand comprising a treestand frame and a platform at a lower portion of said treestand and extending therefrom; said blind comprising:
   (a) first and second telescoping poles, each of said first and second poles having a lower end and an upper end, and each of said first and second poles having an upper portion and a lower portion, said upper portion being less stiff than said lower portion; each of said first and second poles having a tether attached proximate said upper end thereof, said tether being attached to the tree with said first and second poles being bowed both forwardly and laterally under tension;
   (b) a pole mount attached to the platform proximate a front edge thereof; said pole mount having a left and a right receptacle respectively receiving said lower end of said first and second poles with said first and second poles each being forwardly angled a first obtuse angle with respect to horizontal, and with said first and second poles each also being laterally outwardly splayed a second obtuse angle with respect to horizontal; said pole mount comprising:
      i. a pole mount midsection by which said pole mount is attached to said platform; and
      ii. left and right mount sleeves mounted upon said pole mount for selective rotation with respect thereto, said left and right receptacles respectively being angled bores through said pole mount; and
      iii. left and right rotation anchors respectively anchoring said left and right mount sleeves in selective fixed positions with respect to said pole mount midsection; and
   (c) a cover wrapped about said first and second poles and said frame, enclosing said frame on the sides and front and top thereof and providing a covered space inside said cover.

2. The combination as recited in claim 1, in which said pole mount midsection has a longitudinal slot receiving said front edge of said platform therewithin.

3. The combination as recited in claim 2, in which said cover comprises a plurality of zippered flaps that may be selectively opened and closed.

4. The combination as recited in claim 1, in which said cover has left and right walls that are spaced substantially further apart with respect to each other at the front of said blind than at the rear of said blind.

\* \* \* \* \*